US012584450B2

(12) United States Patent
Holt

(10) Patent No.: US 12,584,450 B2
(45) Date of Patent: Mar. 24, 2026

(54) PRE-EXCITATION OF GENSET BASED ON ONE OR MORE TRIGGER SIGNALS

(71) Applicant: RV Mobile Power LLC, Columbus, OH (US)

(72) Inventor: Stephen H. Holt, Columbus, OH (US)

(73) Assignee: RV MOBILE POWER, LLC, Columbus, OH (US)

( * ) Notice: Subject to any disclaimer, the term of this patent is extended or adjusted under 35 U.S.C. 154(b) by 0 days.

(21) Appl. No.: 18/732,915

(22) Filed: Jun. 4, 2024

(65) Prior Publication Data

US 2025/0369402 A1 Dec. 4, 2025

(51) Int. Cl.
*F02D 29/06* (2006.01)
*F02B 63/04* (2006.01)

(52) U.S. Cl.
CPC .............. *F02D 29/06* (2013.01); *F02B 63/04* (2013.01)

(58) Field of Classification Search
CPC ................................. F02D 29/06; F02B 63/04
See application file for complete search history.

(56) References Cited

U.S. PATENT DOCUMENTS

| | | | | |
|---|---|---|---|---|
| 5,539,258 | A | 7/1996 | Sutton et al. | |
| 5,886,504 | A | 3/1999 | Scott et al. | |
| 6,018,200 | A | 1/2000 | Anderson et al. | |
| 6,166,525 | A * | 12/2000 | Crook | H02P 9/08 322/11 |
| 6,664,653 | B1 | 12/2003 | Edelman | |
| 7,076,954 | B1 * | 7/2006 | Sopko, Jr. | F02D 41/0007 290/52 |
| 7,902,910 | B2 | 3/2011 | Park et al. | |
| 7,915,867 | B1 | 3/2011 | Bulthaup et al. | |
| 10,224,847 | B2 | 3/2019 | Dennison | |
| 10,437,317 | B2 * | 10/2019 | Green | G06F 13/4022 |
| 10,879,727 | B1 * | 12/2020 | Cooper | H02J 9/062 |
| 11,121,653 | B2 * | 9/2021 | Onoe | H02P 9/305 |
| 11,253,942 | B2 * | 2/2022 | Ihde | B23K 9/0953 |
| 2005/0140342 | A1 | 6/2005 | Maehara et al. | |
| 2005/0269880 | A1 | 12/2005 | Konishi | |
| 2009/0261599 | A1 | 10/2009 | Alston et al. | |
| 2014/0152006 | A1 | 6/2014 | Sterregaard et al. | |

FOREIGN PATENT DOCUMENTS

| | | | |
|---|---|---|---|
| WO | 2012135258 | A2 | 10/2012 |
| WO | 2016074008 | A1 | 5/2016 |
| WO | 2019177979 | A1 | 9/2019 |

* cited by examiner

*Primary Examiner* — Hai H Huynh
*Assistant Examiner* — Johnny H Hoang
(74) *Attorney, Agent, or Firm* — Suiter Swantz IP

(57) ABSTRACT

Provided herein are exemplary embodiments of a generator having a combustion engine, a throttle operatively connected to the combustion engine, a control board configured to operate the throttle, and a trigger conductor connecting from an appliance to a DC input of the control board, wherein the control board is further configured to direct the throttle to increase the speed of the combustion engine when the trigger conductor is ON. The appliance could be any appliance including air-conditioners, thermostats, and microwaves. Several trigger conductors may be used where if any one is indicated as ON the engine can be driven at a MAX RPM for a Time (T) before returning to normal operations. The increase in RPMs of the engine may be directed by the control board even when the current drawn on the AC output wires of the generator may remain low.

20 Claims, 6 Drawing Sheets

Min LOAD

| Load (amps) | Required RPM | |
|---|---|---|
| 0 - 10 | 1200 | Baseline RPM |
| 10 - 15 | 1350 | |
| 15 - 20 | 1500 | |
| 20 - 25 | 1700 | |
| 25 - 33.33 | 2200 | Max RPM |

PRE-EXCITATION OF GENSET BASED ON ONE OR MORE TRIGGER SIGNALS

BACKGROUND

Electric generators that are driven by combustion engines (ie. generators or gensets) are generally found in two different types. A first type runs the combustion engine at a single speed at all times, no matter the electrical load on the generator. A second type varies the speed of the combustion engine depending on the electrical load on the generator. This second type of generator is typically referred to as an 'inverter generator' as the inverter is used to both produce the electrical output of the generator and measure the electrical load on the generator AC output wires.

An inverter generator has a number of advantages over the first type of generator but it can also have its disadvantages. One issue that presents itself with an inverter generator is the ability to deal with a load that is increasing very quickly. While the inverter generator might eventually produce the level of engine speed that would match the required load, this may take some time, during which time the output voltage of the generator will likely be reduced, possibly into a 'brown out' or other situation where the voltage is too low to run even low amperage devices, resulting in some devices turning off, going into standby, or becoming damaged in the process. This is especially a concern with digital devices being ran on a generator due to the sensitivity of digital electronics to fluctuations in their power supply.

SUMMARY

Disclosed herein are various embodiments of a system and method for pre-excitation of a genset based on trigger signals received from one or more appliances. Exemplary systems can interrupt normal inverter generator operations to immediately drive the engine at MAX RPM based on receiving a trigger signal from one or more appliances. The trigger signals can come at least from fans within air-conditioners, thermostats, door switches of microwaves, or interior lights of microwaves, and similar. Each triggering component may be connected with a conductor to the DC control inputs on the generator which may continue on to a control board within the generator. The generator can also measure the current drawn on the generator's AC outputs to adjust the engine speed when the triggers are determined to be OFF, such that a high influx of current draw is not anticipated, so a lower RPM value can be used until another trigger is determined to be ON.

As used herein the term 'appliance' means any device that requires AC power and includes but is not limited to: air-conditioners, heaters, compressors, hot plates, microwaves, and similar.

In some embodiments, the appliances may have a power draw that ramps up quickly, going from a low amperage requirement to a higher amperage requirement in a relatively short amount of time. In some embodiments, a trigger conductor is ran from a trigger component within the appliance to the control board of an inverter generator. When a trigger voltage is measured on the trigger conductor, the control board may direct the throttle to increase the combustion engine to full power and/or Max RPM for an amount of Time (T). Following the passage of T, the system may return to standard operations where the RPMs are selected based on a Load measurement, sometimes taken at the inverter but can also be a measurement taken from a separate amp meter.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

These drawings illustrate certain aspects of some of the embodiments of the present disclosure and should not be used to limit or define the method.

DETAILED DESCRIPTION

Figure 1:
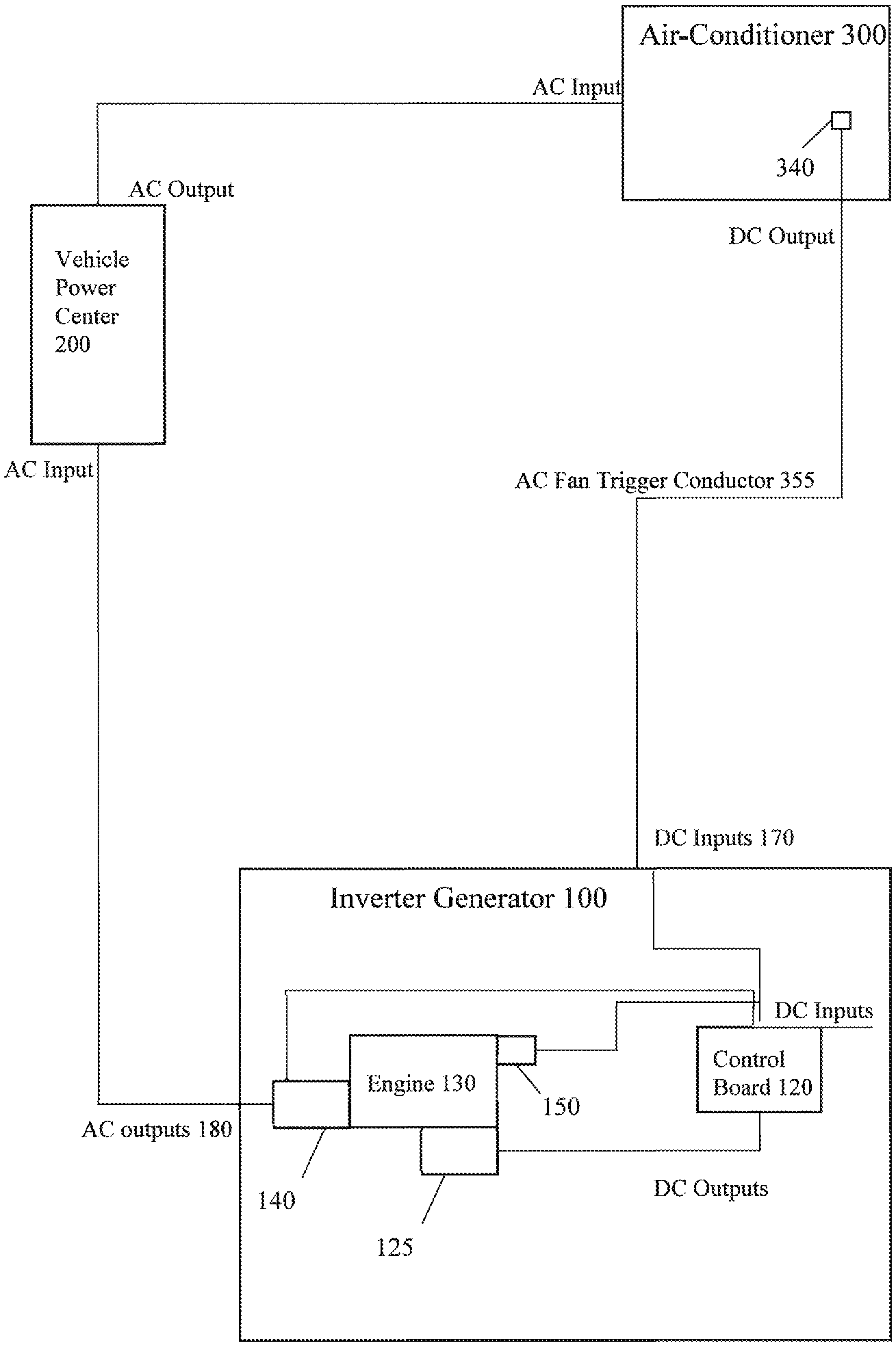
FIG. 1 is an electrical schematic of one embodiment of a system for pre-excitation of an inverter generator based on a trigger signal from an air-conditioner.

100 inverter generator
120 control board
125 throttle
130 engine
140 inverter
150 tachometer
170 DC inputs
180 AC outputs
200 vehicle power center
300 air-conditioner
340 fan
355 fan trigger conductor
400 heater
500 thermostat
525 cooling switch
550 thermostat trigger conductor
575 relay switch
600 microwave
620 door switch
630 light
650 microwave door trigger conductor FIG. 1 is an electrical schematic of one embodiment of a system for pre-excitation of an inverter generator 100 based on a trigger signal from a fan 340 within an air-conditioner 300. In this embodiment, the inverter generator 100 includes a combustion engine 130 which can be operated on any fuel including but not limited to gasoline, natural gas, LP gas, hydrogen, ethanol, or similar fuels. A throttle 125 is positioned to adjust the engine speed of the combustion engine 130 based on electrical instructions sent from the control board 120, where the speed of the engine 130 may be measured in revolutions per minute (RPM). A tachometer 150 may be positioned to measure the rotation of the crankshaft exiting the combustion engine 130 and this measurement data may be transmitted to the control board 120 as feedback to indicate the current speed that the engine is running at. The inverter 140 may be positioned so that is electrically driven by the output of the engine 130 to produce the output AC power for the generator 100. In some embodiments, the inverter 140 also contains an amp meter which measure the LOAD on the AC output wires of the generator 100. As will be explained below, this LOAD data produced by the amp meter (either within the inverter 140 or a separate component) may be sent to the control board 120 for analysis to determine the Desired RPM from the engine 130 based on the LOAD data.

The power that is produced by the inverter generator 100 may exit the generator through the AC outputs 180 and is typically around 110-120 Volts and the amperage will vary depending on the LOAD on the generator or the overall size and power capacity of the generator. In some embodiments, this output power can be sent directly to an appliance, but in other embodiments this output power may be sent through conductors to a vehicle power center 200 which may then distribute the power coming from the generator 100 to a plurality of appliances, both appliances that run on AC power as well as appliances that run on DC power. In addition, the power center 200 may contain a number of AC breakers which are used to protect the appliances and the generator from shorts or large spikes in amperage. Similarly, the power center 200 may contain a number of DC fuses which protect any appliance or device that runs on DC power (typically this is 12 Volts but it can also be 24 Volts or 48 Volts). If the power center 200 is not used and the AC output power of the generator 100 is instead transmitted directly to the appliance (here an air-conditioner 300), it may be advisable to still include a breaker to protect the appliance and generator from an amperage load that is too high and could damage either the appliance and/or the generator.

The power center 200 may have several AC outputs and in this embodiment a set of AC output conductors are connected to an appliance, here an air-conditioner 300 with a typical set of air-conditioner components such as a compressor, refrigeration lines, power supply control board, etc. which have not been shown here as they are not particularly relevant. However, the fan 340 has been shown because the fan 340 of the air-conditioner 300 can be used to produce a trigger for the generator's incoming DC inputs, as will be described further below. In this embodiment, an AC fan trigger conductor 355 may be connected from the fan 340 to the DC inputs 170 on the generator 100. These DC inputs may then connect to the control board 120 of the generator 100 so that the AC fan trigger conductor 355 provides electrical communication between the fan 340 and the control board 120.

The AC fan trigger conductor 335 should be connected to the fan 340 such that when the fan 340 is energized (sent a voltage indicating that the fan 340 should be 'on') this voltage may simultaneously be transferred down the AC fan trigger conductor 335 and ultimately to the control board 120. It has been discovered that the ramp-up process for the compressor (a component of the air-conditioner 300) produces a large increase in the LOAD seen at the generator 100 and often the generator 100 cannot increase the RPMs of the engine 130 quickly enough to carry the load of the compressor during its ramp-up phase when its initially turned on and the current draw of the appliance is changing rapidly. However, the generator 100 can be given a 'head start' in preparations for the large increase in demand by the compressor ramp-up process, by indicating to the generator control board 120 that the fan 340 has been energized and/or is running. The presence of an operating voltage at the fan 340 will typically indicate that the compressor is about to begin its ramp-up process. Therefore, a trigger signal (ie. trigger voltage or pulse) can be sent to the control board 120 so that the throttle 125 can immediately fuel the engine 130 to meet the MAX RPM, prior to the compressor beginning the ramp-up phase. In this way, the generator 100 can quickly begin producing its maximum power output in preparations for the large increase in LOAD that is about to come from the ramp-up of the compressor. In this way, the AC power output by the generator will not have any significant dips in the voltage, or changes to the frequency while the amperage is ramping up to meet the imminent demand of the compressor. Since most air-conditioners 300 are wired so that the fan 340 begins running and moving air before the compressor turns on, this has been found to provide enough of a 'head start' for the generator so that there is no significant impact to the overall power output of the generator even when the LOAD on the generator is increasing rapidly.

Figures 2, 3:
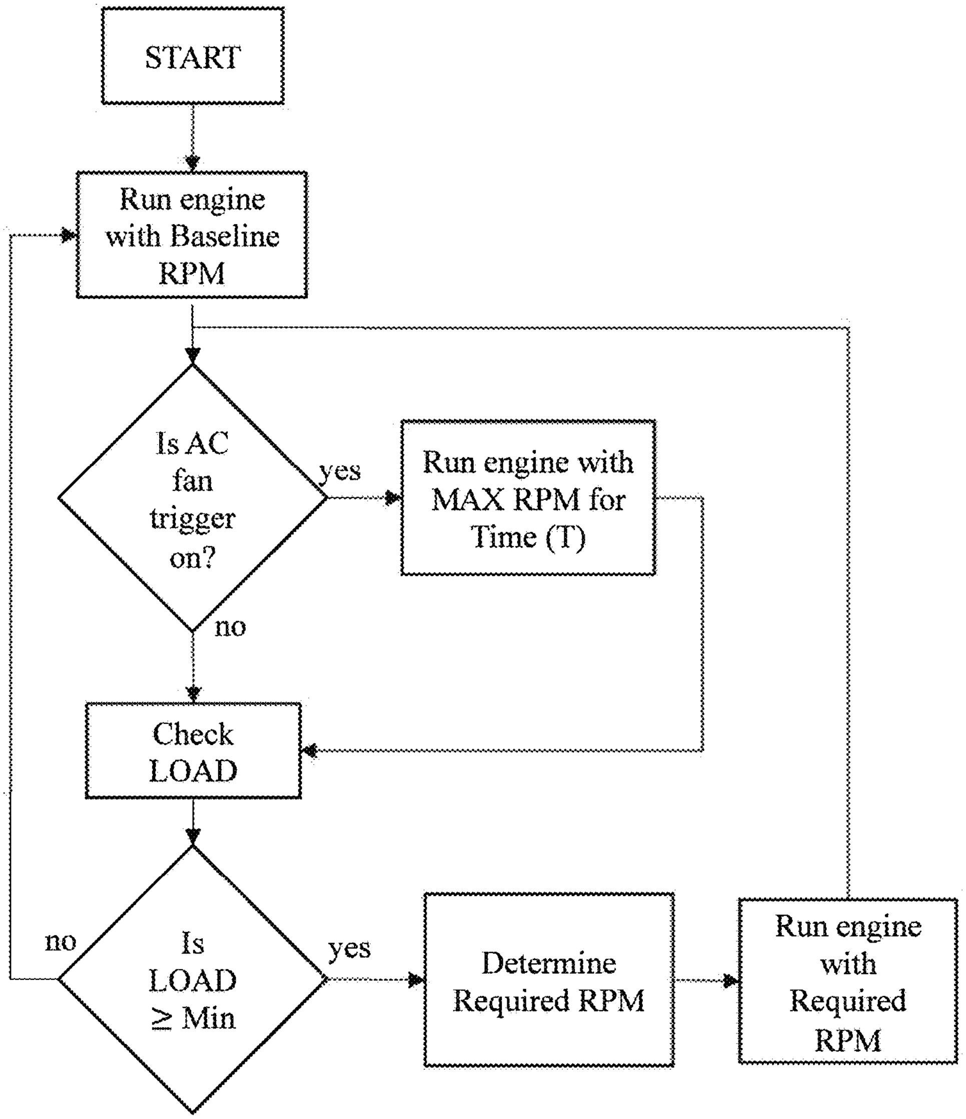
FIG. 2 is a lookup table showing one embodiment for the relationship between Load on the generator and the Required RPM at the combustion engine.
FIG. 3 is a logic flow chart showing one embodiment for a method of operating the system shown in FIG. 1 as well as similar systems.

FIG. 2 is a lookup table showing one embodiment for the relationship between LOAD on the generator and the Required RPM at the combustion engine. The term 'Baseline RPM' is used herein to represent the engine speed used when the generator 100 is initially started and when the LOAD on the generator is less than a Min LOAD. The term 'Min LOAD' is used herein to represent the LOAD that corresponds with the Baseline RPM, and this can be further defined as either the LOAD that is produced by the generator at the Baseline RPM or the maximum LOAD that the generator can handle when running at the Baseline RPM.

In the table shown the left hand column represents the LOAD (amps) that can be handled by the generator when running at the RPM amounts shown in the right hand column. Essentially, to determine the Required RPM for the engine, the system would simply need to determine the LOAD measured on the generator (either in the inverter or in a separate amp meter), locate the measured LOAD in the left hand column, match this LOAD with the Required RPM in the right hand column, and communicate with the throttle 125 to fuel the engine to reach the Required RPM.

Also note in the chart that the Baseline RPM is shown as essentially the minimum RPM that the engine will run to produce enough power for small loads (zero to Min LOAD). In this embodiment, the Min LOAD would be considered approximately 10 amps, at which point if a LOAD is measured above 10 amps the system would increase the Required RPM to match the increase in the LOAD. In this embodiment the next increase would be to increase from 1200 to 1350 RPM but of course this can vary. One can see how the Required RPM increases as the LOAD increases until finally reaching a 'Max RPM' which as used herein represents the maximum speed that the engine runs in order to produce the highest amount of power available from the generator. As known in the art, the precise maximum power output by the generator can change over time due to multiple factors, so the term Max RPM does not require always getting the absolute maximum power out of the generator at this speed, but more that this is the highest speed that the engine will generally run based on safety, efficiency, and other factors. So it could also be described as the maximum speed that the generator is permitted to run through its normal software controls, and not the absolute maximum speed possible by the engine.

It should be specifically noted that the data shown in FIG. 2 is only a sample and is also simplified and is not required by the invention but used only to provide a basic framework to explain the embodiments of the invention. Obviously there are many different sizes and types of generators and many will not use these precise amounts for the LOAD and Required RPM but they would all generally have a Baseline RPM, Max RPM, and some relationship between the LOAD and the Required RPM (although maybe not the ones shown here). This particular example is provided based on a 4,000 Watt generator that produces a maximum 33.3 amps with 120V and approximately 60 Hz.

FIG. 3 is a logic flow chart showing one embodiment for a method of operating the system shown in FIG. 1 as well as similar systems. The embodiment begins by running the engine at the Baseline RPM, which can be performed when the control board 120 transmits electrical information to the throttle 125 to increase the fuel until the tachometer 150 indicates that the engine speed has reached the Baseline RPM. The tachometer 150 data is sent back to the control board 120 as part of a feedback loop to ensure the throttle 125 is being controlled accurately, in other words the desired RPM is being produced at the engine 130. This is one of many ways to provide engine speed feedback to the control board 120. After the Baseline RPM is reached, the system may then proceed to check the status of the AC fan trigger conductor 355. If the conductor 355 has a voltage (or is otherwise energized in some way), then this indicates to the system that the AC fan trigger is ON and when this occurs the system may then begin running the engine 130 at the MAX RPM for Time (T). The precise amount of time chosen for T can vary depending on the situation and the appliance that is providing the trigger signal. Generally speaking, the value for T should be chosen to ensure that the engine runs at MAX RPM during the full ramp-up in current drawn by the appliance while turning on. Thus, T should not be so short such that the engine would slow down before the appliance has reached its full current draw. In most embodiments, the time for T should be about 2 min-5 min but it could be as low as 10 seconds or as long as 10 minutes in some embodiments. Once the trigger signal has been received, the system may move as quickly as possible to begin running the engine at MAX RPM, so that the generator can get as much of a head start on the appliance as possible.

If however, the system determines that the AC fan trigger is OFF, the system may then measure the current drawn at the AC output conductors of the generator (LOAD) to determine if this current draw meets or exceeds the Min LOAD. If so, the system would then determine the Required RPM for the engine, and this could be done in a number of ways. First, a lookup table similar to the one shown in FIG. 2 may be used where the Required RPM can be determined by extracting the data from the proper column corresponding to the measured LOAD or range of LOADs. Second, a mathematical relationship, formula, or algorithm could be used where the Required RPM is determined from the operation of a real time calculation. Other methods could also be used and would be within the scope of this invention. Here, for simplicity in this example, we are using a very basic look up table in FIG. 2.

Once the Required RPM is determined, the system may drive the engine 130 at the Required RPM and one way that this can be accomplished is for the board 120 to send a signal to the throttle 125 to increase the fuel until the tachometer 150 sends data back to the board 120 indicating that the Required RPM has been reached. At this point in the method the system could either immediately return to check the status of the AC fan trigger or wait a certain amount of time (1 s, 5 s, 10 s, etc) and then return to check the status of the AC fan trigger.

However, if instead the LOAD is measured and determined to be less than the Min LOAD, the system may direct the throttle to run the engine until the Baseline RPM is measured with the tachometer and sent back to the board, i.e. drive the engine at the Baseline RPM because there is no trigger detected and the LOAD on the generator is below Min LOAD.

Figure 4:
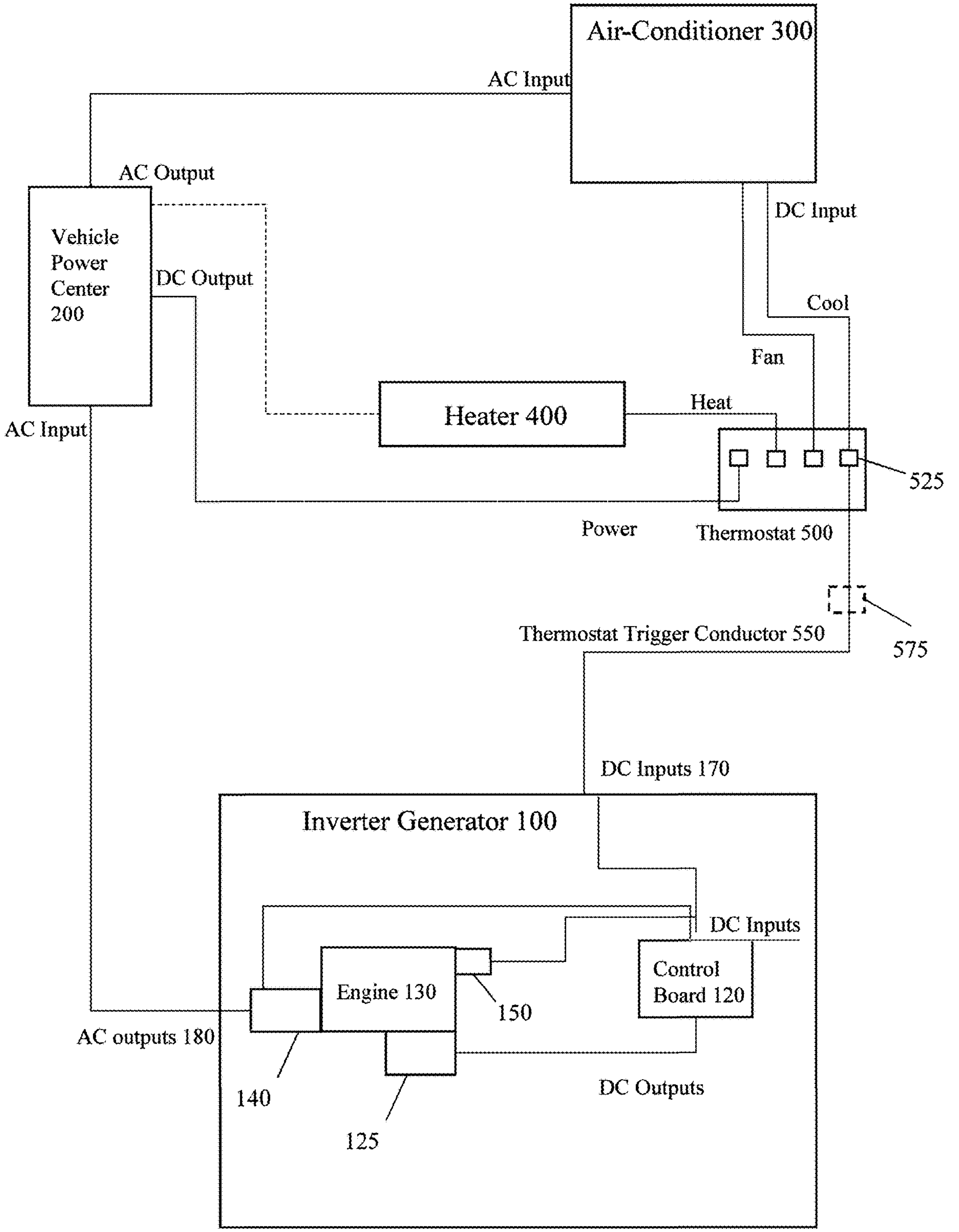
FIG. 4 is an electrical schematic of one embodiment of a system for pre-excitation of an inverter generator based on a trigger signal from a thermostat.

FIG. 4 is an electrical schematic of one embodiment of a system for pre-excitation of an inverter generator 100 based on a trigger signal from a thermostat 500. In this embodiment, rather than using the fan of the air-conditioner as the triggering device, the cooling switch 525 on the thermostat 500 is used as the triggering device. The cooling switch 525 can be described as the contact on the thermostat 500 that is energized to indicate that cooling is needed by the air-conditioner 300. The thermostat trigger conductor 550 may be ran from the cooling switch 525 to the DC inputs 170 on the generator 100 which would continue on to the control board 120.

Note that there may also be a conductor ran from the cooling switch 525 to the DC inputs on the air-conditioner 300. Also shown in this embodiment is a heater 400 which also receives a conductor from the thermostat 500 and would become energized when heating is needed. In some embodiments, the heater 400 would be an electric heater and would have AC conductors connecting the heater 400 with the power center 200. Of course, other types of heaters can be used which are not electric but would instead be powered by LP gas or natural gas. When connected in this manner, when the thermostat 500 has reached a condition where cooling is needed it will energize the cooling switch 525 which simultaneously energizes the thermostat trigger conductor 550 indicating that this trigger is ON to the control board 120.

In the embodiment shown, an optional relay switch 575 may be placed somewhere along the thermostat trigger conductor 550 (or in other words a pair of positive and negative conductors running from the cool switch 525 to the relay switch 575 and another pair of positive and negative conductors running from the relay switch 575 to the DC inputs 170 on the generator 100. The relay switch 575 is optional as it may be useful to help may a clear electrical indication to the control board 120 that the appliance is about to increase in current draw. This may be useful depending on how sophisticated the logic can be for the control board 120, when using a less flexible or powerful logic on the control board 120, the relay switch 575 can make the functions described herein easier to code into the software logic. However, the relay switch 575 is not necessary as the logic in the control board 120 could also look for specific voltages, s range of voltages, a current draw, range of current draws, or a dramatic increase in voltage or current to also determine that the trigger is ON and the appliance is about to increase in current draw.

Figure 5:
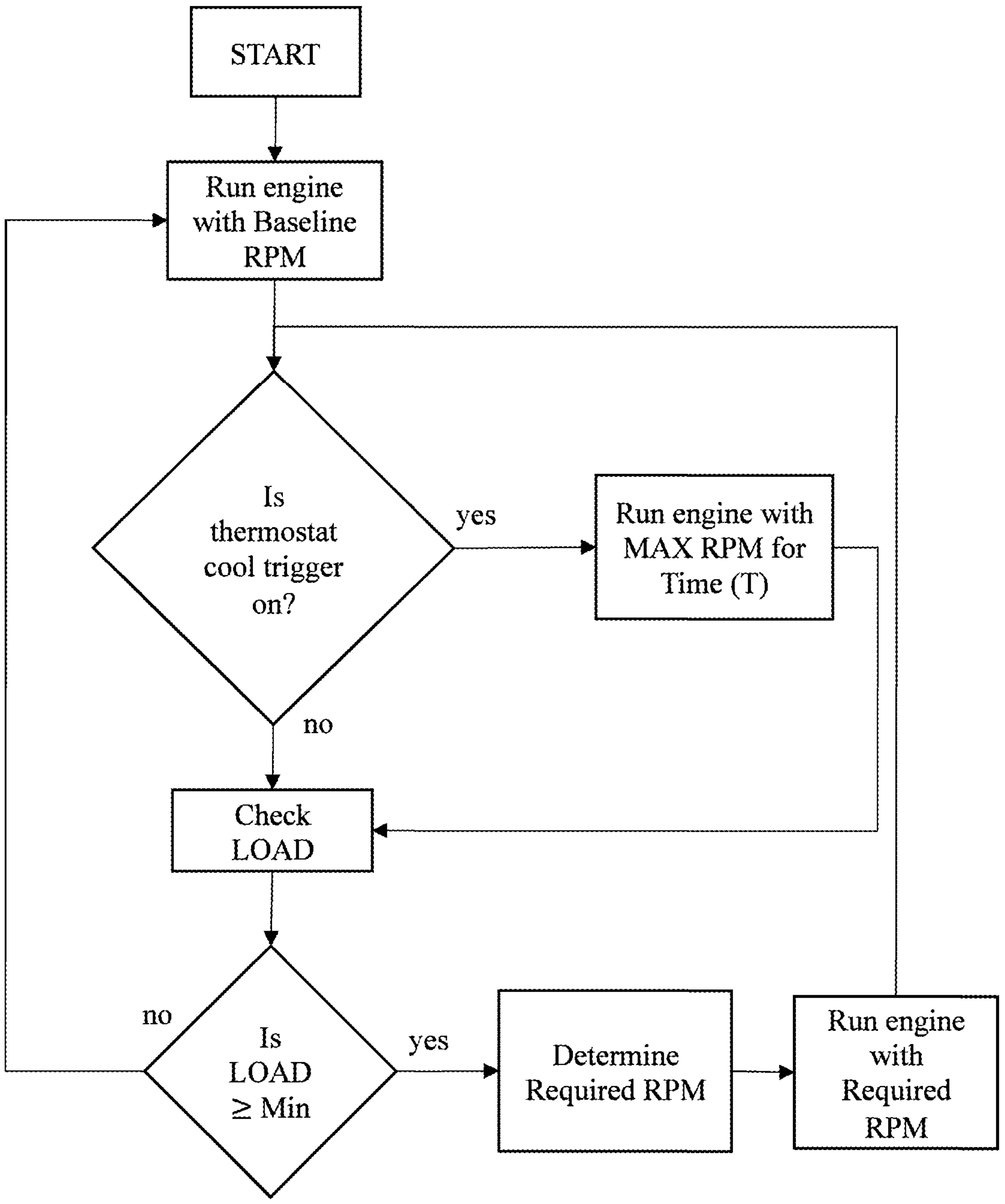
FIG. 5 is a logic flow chart showing one embodiment for a method of operating the system shown in FIG. 4 as well as similar systems.

FIG. 5 is a logic flow chart showing one embodiment for a method of operating the system shown in FIG. 4 as well as similar systems. This embodiment operates similar to the embodiment described above, with the notable exception that the system is looking for a trigger from the thermostat 500 rather than the fan within the air-conditioner. This operation allows the air-conditioner to operate in the 'Fan Only' mode without causing a trigger signal to be sent to the generator. Thus, it allows a user to run the fan only (no compressor cooling) of their air-conditioner without necessarily having to increase the RPM of the engine to MAX which saves fuel and keeps the ambient noise level at a lower volume. This can also be an easier wire to route back to the generator DC inputs 170 because the thermostat 500 is typically inside the vehicle while the air-conditioner 300 is typically outside the vehicle and on the roof, making the wire routing to the generator more complex.

Figure 6:
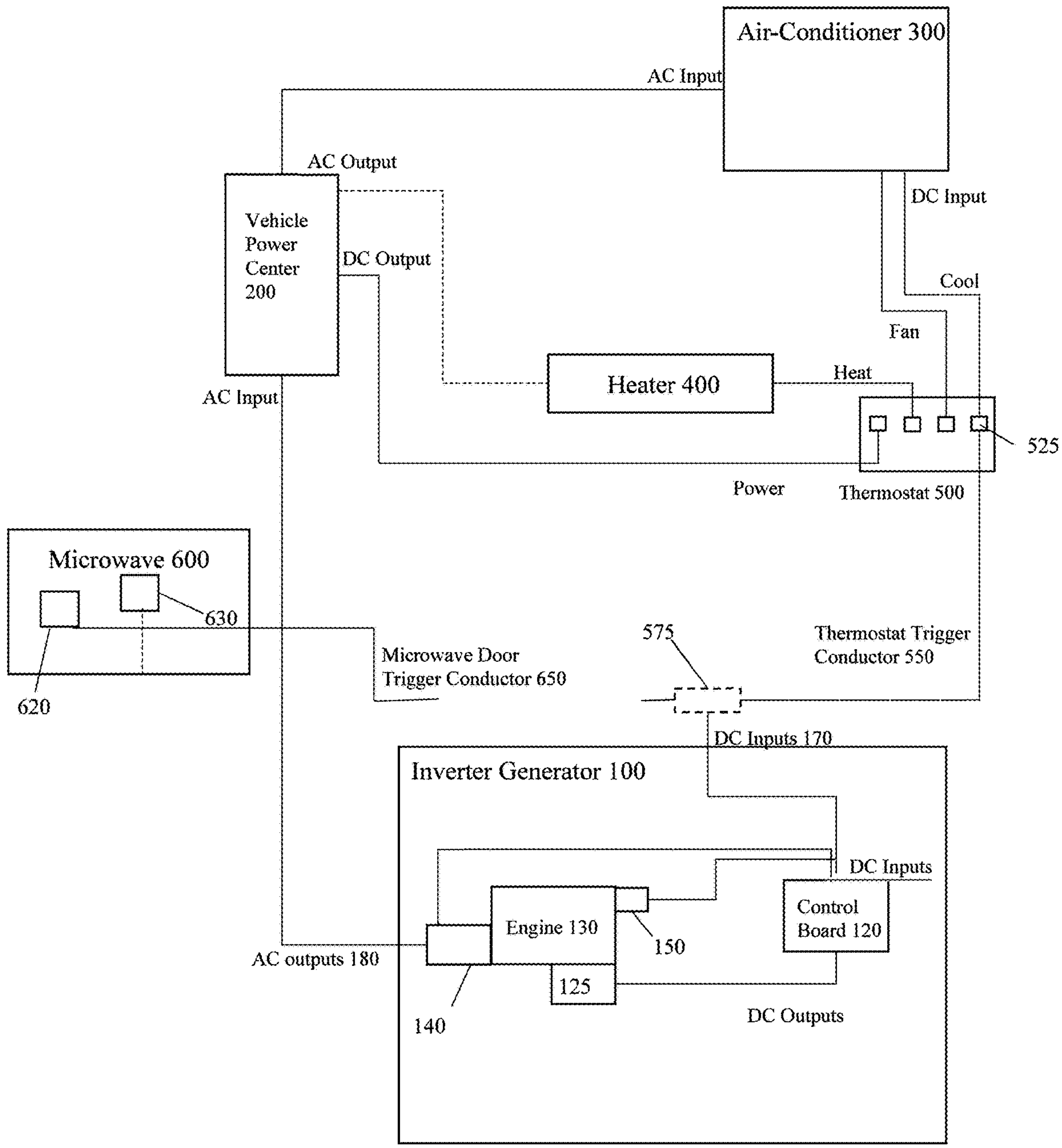
FIG. 6 is an electrical schematic of one embodiment of a system for pre-excitation of an inverter generator based on a first trigger signal from a thermostat as well as a second trigger signal from a microwave.

FIG. 6 is an electrical schematic of one embodiment of a system for pre-excitation of an inverter generator 100 based on a first trigger signal from a thermostat 500 as well as a second trigger signal from a microwave 600. This embodiment is also similar to the ones shown and described above however now a second appliance can be used to trigger the generator into a pre-excitation, here this appliance is a microwave 600. It has been discovered, that by connecting to the door switch 620 of the microwave 600 (or the door light 630), this can provide enough time for the generator 100 to get a head start before the other larger components of the microwave 600 (such as the magnetron) begin their rapid increase in current draw. Thus, a microwave door trigger conductor 650 may be used to connected between the door switch 620 and the DC inputs 170 of the generator. Alternatively, the microwave door trigger conductor 650 may be connected to the light 630 inside the microwave 600 which will illuminate when the door is opened. Thus, there are different ways to provide a trigger signal from the microwave 600 to indicate that the magnetron is about to start increasing the current draw of the microwave 600. This signal may be received at the board 120 where the throttle 125 can immediately drive the engine 130 at MAX RPM.

The optional relay switch 575 may also be used with some embodiments where each of the trigger conductors 550/650 may be combined at a single relay switch 575 so that only one conductor would need to continue out of the relay switch 575 and connecting to the DC inputs 170 on the generator 100. In some embodiments, separate relay switches 575 may be used for the thermostat trigger conductor 550 and the microwave door trigger conductor 650, depending on the application.

Figure 7:
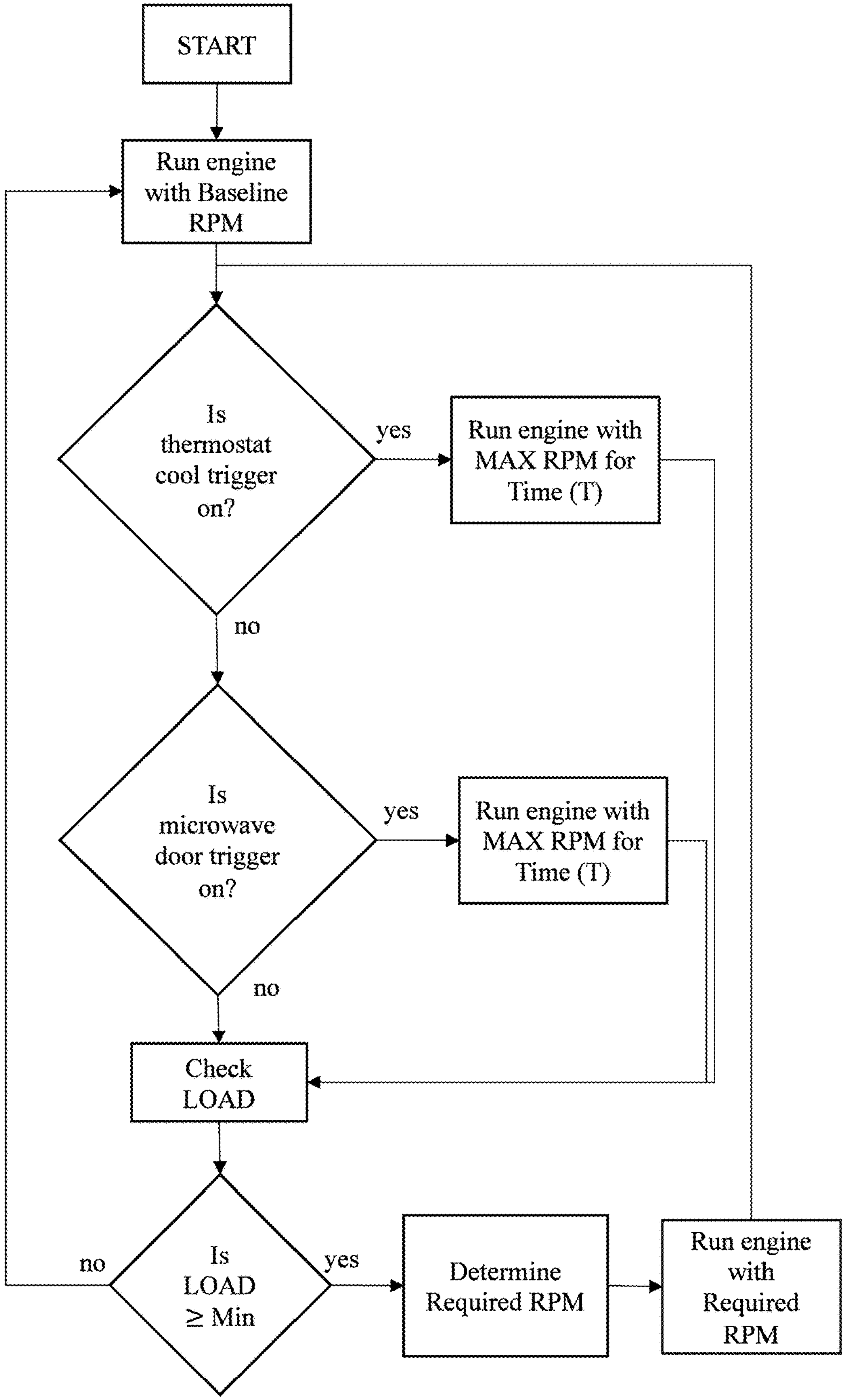
FIG. 7 is a logic flow chart showing one embodiment for a method of operating the system shown in FIG. 6 as well as similar systems.

FIG. 7 is a logic flow chart showing one embodiment for a method of operating the system shown in FIG. 6 as well as similar systems. This embodiment is also similar to the ones shown and described above however now there is a second logic step following the step of determining if the thermostat cool trigger was ON, by also now determining if the microwave door trigger is ON (is the microwave door trigger conductor 650 energized) or OFF. If the system determines that the microwave door trigger is OFF, it may then measure the current drawn at the AC output conductors of the generator (LOAD) to determine if this current draw meets or exceeds the Min LOAD. If so, the system may then determine the Required RPM for the engine and run the engine at the Required RPM. Following this step, either immediately or after waiting a certain amount of time (1 s, 5 s, 10 s, etc), the system may then return check the status of the thermostat cool trigger and microwave door trigger.

Thus at any point in time during normal operations of the inverter generator (i.e. the steps of determining the Required RPM and running the engine at the Required RPM) the system could be triggered by one or more appliances to immediately increase the engine to Max RPM. Once the appliance is later turned off and then turned back on again, a later trigger signal will then be sent and the generator will interrupt the normal operations once again and increase the engine speed to the Max RPM. Note that in some embodiments the Max RPM is only ran for Time (T), after which point the system may re-start normal operations (the steps of determining the Required RPM and running the engine at the Required RPM).

Note that in some embodiments the the system could be triggered by one or more appliances to immediately increase the engine to Max RPM regardless of the amperage being drawn by the generator. For example, even if a small number of amps (1-5 amps) are being drawn by the generator, when a trigger signal is determined to be ON the control board will direct the throttle to increase to a much higher RPM than is required for the smalle number of amps being drawn currently. This is 'pre-excitation' of the generator based on a trigger signal, it will not necessarily take into consideration the draw on the AC output wires of the generator (which is more of the traditional operations of an inverter generator-in some embodiments the operation is very different from a pure inverter generator.

As used herein the term 'control board' is used to represent all of the necessary electrical components to operate the logic and method shown and described herein, including but not limited to a microprocessor, storage, RAM, CPU, computer, power modules, power conditioners, and similar. The use of a 'board' or PCB is not necessarily required as sometimes all of these components come within a module or assembly that is not necessarily based on a traditional PCB layout.

As used herein the term 'vehicle' is used to represent any moving or movable device including but not limited to trucks, RV's, mobile housing trailers, buses, campers, 5$^{th}$ wheel trailers, cars, toy-haulers, and similar.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A generator comprising:

a combustion engine;

a throttle operatively connected to the combustion engine;

a control board configured to operate the throttle;

a trigger conductor connecting from an appliance to a DC input of the control board; and AC outputs configured to transfer AC power produced by the generator to the appliance;

wherein the control board is further configured to direct the throttle to increase a speed of the combustion engine when the trigger conductor is ON.

2. The generator of claim 1 wherein:

the control board increases the throttle immediately upon receipt of an ON signal from the trigger conductor.

3. The generator of claim 1 further comprising:

a relay switch connected to the trigger conductor between the appliance and the DC input of the generator.

4. The generator of claim 1 wherein:

the appliance is an air-conditioner.

5. The generator of claim 1 wherein:

the appliance is a thermostat.

6. The generator of claim 1 wherein:

the appliance is a microwave oven.

7. The generator of claim 1 wherein:

the control board is further adapted to decrease the throttle after Time (T) if a current drawn by the generator has not increased over Time (T).

8. A generator comprising:

a combustion engine;

a throttle operatively connected to the combustion engine;

a control board configured to operate the throttle; and a trigger conductor connecting from an appliance to a DC input of the control board;

wherein the control board is further configured to direct the throttle to increase a speed of the combustion engine even when the current drawn by the generator is not increasing.

9. The generator of claim 8 wherein:

the appliance is an air-conditioner having a fan; and the control board is further adapted to increase the speed of the combustion engine when the fan starts.

10. The generator of claim 8 wherein:

the appliance is a thermostat having a cool switch; and the control board is further adapted to increase the speed of the combustion engine when the cool switch energizes.

11. The generator of claim 8 wherein:

the appliance is a microwave having an interior light; and the control board is further adapted to increase the speed of the combustion engine when the interior light energizes.

12. The generator of claim 8 further comprising:

a relay switch positioned on the trigger conductor.

13. The generator of claim 8 further comprising:

a second trigger conductor connecting from a second appliance to a DC input of the control board.

14. The generator of claim 13 wherein:

wherein the control board is further configured to increase the speed of the combustion engine when the second trigger conductor is energized.

15. A system comprising:

an appliance comprising a triggering component;

a generator comprising

AC output power wires which direct power to the appliance;

an inverter powering the AC output wires;

one or more DC inputs; and a control board in electrical connection with the DC input; and a trigger conductor connecting from the triggering component to a DC input of the generator;

wherein the control board is configured to increase the power produced by the inverter when the trigger conductor is ON.

16. The system of claim 15 further comprising:

a second appliance comprising a second trigger component; and a second trigger conductor connecting from the second trigger component to a DC input of the generator.

17. The system of claim 16 wherein:

the control board is further configured to increase the power produced by the inverter when either the first trigger conductor or the second trigger conductor is ON.

18. The system of claim 15 wherein:

the appliance is an air-conditioner and the triggering component is a fan.

19. The system of claim 15 wherein:

the control board is further configured to adjust the power produced by the inverter based on the current draw on the AC output power wires when the trigger conductor is OFF.

20. The system of claim 16 further comprising:

a relay switch connected to both the first trigger conductor and the second trigger conductor.

* * * * *